United States Patent [19]
Alinari

[11] 3,717,032
[45] Feb. 20, 1973

[54] DEPTH GAUGE

[76] Inventor: Carlo Alinari, Corso Vittorio Emanuele 200, Turnin, Italy

[22] Filed: March 23, 1971

[21] Appl. No.: 127,150

[52] U.S. Cl. ................................73/300, 73/431
[51] Int. Cl. ................................G01f 23/14
[58] Field of Search........73/300, 431, 374, 376, 377, 73/388, 401

[56] References Cited

UNITED STATES PATENTS

| | | | |
|---|---|---|---|
| 3,677,087 | 7/1972 | Alinari | 73/300 |
| 3,188,864 | 6/1965 | Dean | 73/300 |
| 3,528,290 | 9/1970 | Lecocq | 73/300 |

FOREIGN PATENTS OR APPLICATIONS

| | | | |
|---|---|---|---|
| 1,011,265 | 4/1952 | France | 73/300 |
| 1,358,548 | 3/1964 | France | 73/388 R |

*Primary Examiner*—Louis R. Prince
*Assistant Examiner*—Denis E. Corr
*Attorney*—Sughrue, Rothwell, Mion, Zinn & Macpeak

[57] ABSTRACT

A manometer type depth gauge has a curved manometer tube with its open end spaced slightly apart from its closed end; It is received in a groove on the edge of a base member of dark color, being clamped in place by a cover member that is removably attached to the base member. The cover member contacts the tube but leaves part of the tube uncovered to by struck directly by incident light.

2 Claims, 6 Drawing Figures

PATENTED FEB 20 1973
3,717,032
SHEET 1 OF 2
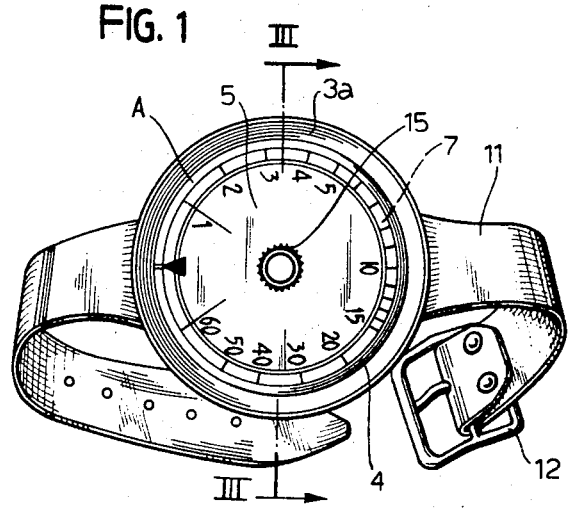
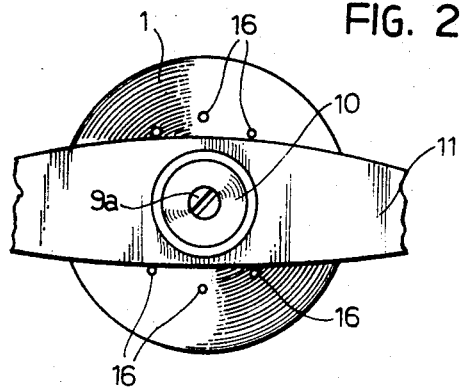
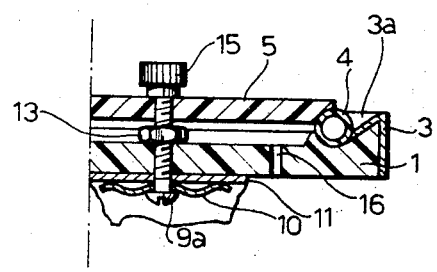
INVENTOR
CARLO ALINARI
BY Sughrue, Rothwell, Mion, Zinn & Macpeak
ATTORNEYS

PATENTED FEB 20 1973 3,717,032

INVENTOR

BY

ATTORNEY

DEPTH GAUGE

This invention relates to depth gauges of the manometer type. In such gauges, a narrow transparent tube with a closed end and an open end is immersed in a liquid at the depth required to be measured. The liquid penetrates some distance into the interior of the tube, compressing the air it contains and forming a meniscus at a distance from the open end that is dependent on the depth. Such distance is read by the user on a scale which is attached to the tube.

If the gauge is used in liquids which tend to corrode or encrust the tube, it is necessary for the tube to be cleaned and dried after immersion. It is also necessary, where the gauge is to be used for skin diving and other activities in the sea, where the light may be poor, that the meniscus and the scale should be clearly visible. Furthermore, it is necessary that the gauge, when it is to be carried by a diver, should be as compact as possible.

An object of the invention is to provide a manometer type depth gauge which satisfies these criteria and which is simple and relatively inexpensive.

According to the invention, a depth gauge comprises a transparent manometer tube, closed at one end and open at the other, curved so that the ends approach but do not contact each other, the tube being supported on a base member having a groove in an edge zone in which groove a part of the tube is received, at least such edge zone of the base member being dark in color, the tube being held on the base member by a cover member that is removably attached to the base member and has a transparent edge zone which clampingly contacts the tube but leaves a portion of the tube uncovered, and including a graduated scale located along the length of the tube.

In a preferred form, the scale is located between the cover member and the base member. The scale may be imprinted or otherwise formed directly on the surface of the cover member.

In the drawings:

FIG. 1 is a schematic plan view of a depth gauge according to the invention;

FIG. 2 is an underplan view of the gauge of FIG. 1;

FIG. 3 is a sectional view of a part of the gauge of FIGS. 1 and 2, taken on an enlarged scale on the line III—III of FIG. 1;

Figure 4:
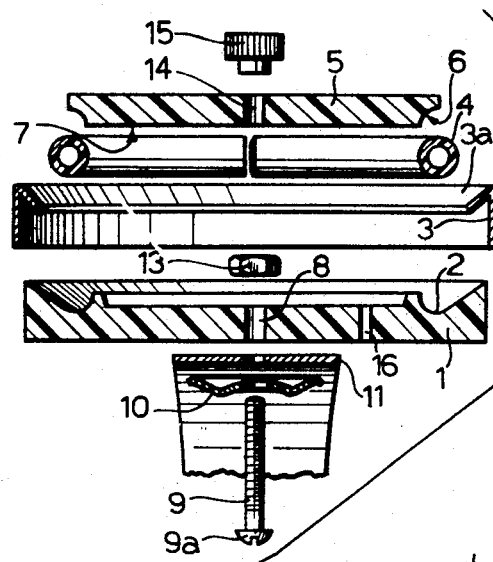
FIG. 4 is an exploded view corresponding to FIG. 3.

In the embodiment of FIGS. 1 to 4, there is a rigid circular base member 1 which may be of a plastic material, having a groove 2 in its edge zone. At least the edge zone of the base member 1 is of a dark color, preferably black.

Surrounding the base member 1 is a metal ring 3 having a sloping lip 3a which seats in the groove 2. The ring 3 preferably has a smooth or silvered or brightly colored surface in order to reflect as much light as possible from its lip 3 into the groove 2. In the groove 2 is located a flexible transparent manometer tube 4 having one end closed and the other end open, curved to circular shape with the ends approaching but not contacting each other.

The tube 4 is held on the base member 1 by a cover member 5 in the form of a disc of transparent plastic material, the edge zone of the disc 5 having a bevelled edge 6 that is arcuate in profile and complemental to the curvature of the tube 4. The edge 6 clampingly engages the tube 4 but leaves a portion of the tube 4 uncovered.

The undersurface of the disc 5 has a colored sheet 7 secured to it, in which is imprinted a scale graduated according to depth and visible through the top of the disc 5.

The cover disc 5 is removably attached to the base member by a stud 9 having a head 9a which engages a shaped metal washer 10 that clamps a strap 11 against the undersurface of the base member 1. The stud passes through a hole 8 in the base member 1 and is fixed to it by a nut 13. The upper part of the stud 9 passes through a hole 14 in the cover disc 5 and receives a knurled assembling nut 15. A buckle 12 is attached to the strap 11 to allow the gauge to be worn on the user's wrist.

The base member 1 has several holes 16 passing through it to allow liquid to enter freely into the space between the base member 1 and the cover disc 5.

The tube 4 is naturally mounted with its ends correctly positioned in relation to the markings on the scale 7.

When the gauge is immersed in liquid which enters some distance into the tube 4, this tube is illuminated both by light directly striking the tube 4 itself and light passing through the transparent cover disc 5 to strike the tube. Illumination is enhanced by reflected light from the lip 3a of the ring 3. It has been found that in these circumstances, and particularly against the dark background of the groove 2 in the base member 1, the bore of the tube 4 in so far as it contains air has a silver appearance. The part containing liquid, on the other hand, appears dark, as indicated by the dark line A in FIG. 1. It is thus easy to establish the position of the meniscus separating these parts of the tube and to read off the corresponding depth value on the scale 7.

Figure 5:
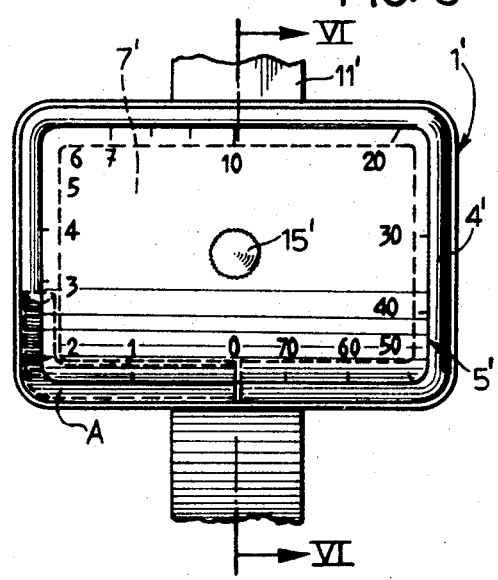
FIG. 5 is a schematic plan view of a different depth gauge according to the invention.
Figure 6:
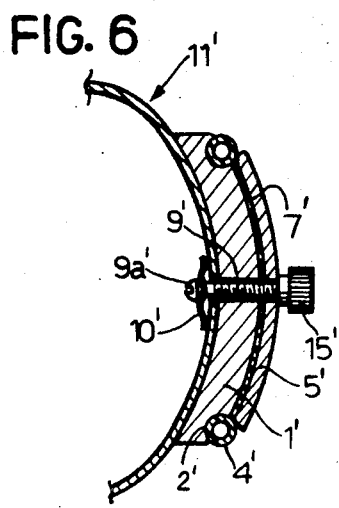
FIG. 6 is a sectional view on the line VI—VI of FIG. 5.

In the embodiment of FIGS. 5 and 6, the depth gauge is generally rectangular but has rounded corners. In section (FIG. 6) it is curved to follow the curvature of the user's wrist. The gauge comprises a base member 1' having a peripheral groove 2' accommodating a part of a flexible transparent manometer tube 4' whose open and closed ends are spaced slightly apart. The base member 1' is again formed of a dark plastic material. A cover plate 5' is secured to the base member 1' by a stud 9' having a head 9a' that bears on a washer 10'. The washer 10' in turn holds a strap 11' on the undersurface of the base member 1'.

The cover plate 5' has an edge zone contacting the tube 4' to clamp it in the groove 2' but leaving a portion of the tube 4' uncovered. The undersurface of the cover plate 5' and the upper surface of the base member 1' are complementally curved, and between them is clamped a graduated scale 7' in the form of a flexible plastics sheet on which markings indicating depth have been made. A knurled nut 15' holds the assembly in place. The black background of the base member 1' again allows clear reading of the part A' of the bore of the tube 4' which contains liquid, as compared to the silvery part containing air.

In both the above-described embodiments the gauge may be easily disassembled to remove the manometer tube and clean and dry it after use.

What I claim is:

1. The depth gauge comprising a transparent manometer tube closed at one end and open at the other end, said tube being curved so that the ends approach but do not contact each other, a base member having a groove disposed in a dark color edge zone in which said tube is partially received, a cover member having a transparent edge portion with a graduated scale thereon partially superimposed over said tube, means for detachably securing said cover member to said base member for clamping and securing said tube therebetween and a reflective ring member secured to said base member, said ring member having a lip extending into a groove in said base member.

2. A depth gauge comprising a transparent manometer tube closed at one end and open at the other end, said tube being curved so that the ends approach but do not contact each other, a base member having a groove disposed in a dark color edge zone in which said tube is partially received, a cover member having a transparent edge portion with a graduated scale thereon partially superimposed over said tube, and means for detachably securing said cover member to said base member for clamping and securing said tube therebetween, said base member having a plurality of holes extending therethrough to allow the passage of liquid in which the gauge is immersed.

* * * * *